United States Patent Office 3,389,168
Patented June 18, 1968

3,389,168
ALLYL BENZOPHENONETETRACARBOXYLATES
John William Hirzy, St. Louis, Mo., assignor to Monsanto Company, St. Louis, Mo., a corporation of Delaware
No Drawing. Filed Aug. 23, 1965, Ser. No. 481,966
10 Claims. (Cl. 260—485)

This invention relates to a new class of chemical compounds. More particularly, this invention relates to novel allyl benzophenonetetracarboxylates. The compounds have been found to be useful as plasticizers and cross-linking agents for halogen-containing vinyl polymers.

The novel tetracarboxylates of the invention have the general formula

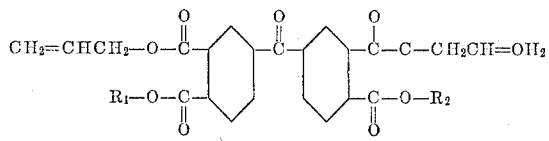

wherein $R_1$ and $R_2$ are like radicals selected from the group consisting of allyl, alkyl having from 1 to 18 carbon atoms and cycloalkyl having from 6 to 18 carbon atoms.

It is a primary object of this invention to provide novel allyl benzophenonetetracarboxylates.

A further object is to provide a novel class of allyl benzophenonetetracarboxylates which are useful as plasticizers and cross-linking agents.

Other and different objects, features and advantages of this invention will become apparent to those skilled in the art upon consideration of the following detailed description thereof and the examples attendant thereto.

It has been found that the heretofore described allyl benzophenonetetracarboxylates can be readily prepared by heating at a temperature of from about 50° C. to about 200° C. in equimolar quantities, a benzophenonetetracarboxylic dianhydride, and alkanol or allyl alcohol, a tertiary amine and allyl chloride.

The alkyl and cycloalkyl radicals can be derived from many sources. For example, the alkyl radicals can be straight or branched chain radicals having up to 14 carbon atoms derived from various sources such as alcohols, including alcohols produced by the oxo synthesis or alcohols obtained by catalytic dehydrogenation of coconut oil, from oxidized waxes or from esterification if a carbonyl group by reaction with an olefin. Illustrative examples of alkyl radicals are: methyl, ethyl, propyl, isopropyl, n-butyl, isobutyl, sec-butyl-tert-butyl, n-amyl, isoamyl, n-hexyl, isohexyl, 2-ethylheptyl, 2-ethylhexyl, octyl, iso-octyl, 2-octyl, isononyl, decyl, lauryl, tetradecyl, octadecyl, alkyl radicals derived by $C_3$ to $C_{14}$ oxo alcohols, etc. Illustrative examples of cycloalkyl radicals are: 2-methylcyclopentyl, 3-methylcyclopentyl, 2,4 - dimethyl cyclopentyl, cyclohexyl, 3-methylcyclohexyl, 4-methylcyclohexyl, 3,5-dimethylcyclohexyl, 3,3-dimethylcyclohexyl, 3-ethylcyclohexyl, 4-ethylcyclohexyl, propylcyclohexyl, 2-propylcyclohexyl, 4-n-propylcyclohexyl, 3-isopropylcyclohexyl, 4-isopropylcyclohexyl, methylcyclohexylethyl, butylcyclohexyl, hexylcyclohexyl, octylcyclohexyl, 3-nonylcyclohexyl, 4-nonylcyclohexyl, 3-dodecylcyclohexyl, 4-dodecylcyclohexyl, 3,3,5-trimethylcyclohexyl, cycloheptyl, 2,4-dimethylcycloheptyl, 2,3,5-trimethylcycloheptyl and the like.

Tertiary amines suitable for use in preparing the compounds of this invention can be represented by the formula,

wherein: $R_1$, $R_2$ and $R_3$ are like or unlike saturated aliphatic radicals. Preferably, $R_1$, $R_2$ and $R_3$ have a total of 3 to 24 carbon atoms, and it is also preferred that $R_1$, $R_2$ and $R_3$ be alkyl radicals. Non-limiting examples of such tertiary amines are trimethylamine, triethylamine, tri-n-propylamine, triisopropylamine, tri-n-butylamine, triisoamylamine, trihexylamine, triethanolamine, methyldiethylamine, dimethylethylamine, methyldiethanolamine, dimethylethanolamine, dimethylcyclohexylamine, dimethylhexylamine, diethylhexylamine, dimethyldecylamine and the like.

The invention will be more readily understood by reference to the following examples which describe the detailed preparation of representative compounds. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

Example 1

To a suitable reaction vessel having means for the addition and removal of heat, means for measuring the temperature of the reaction mass, means for agitating the reaction mass, means for the addition and removal of solids and liquids and fitted with a condenser, there is charged 322.0 grams (1.0 mole) of 3,3',4,4'-benzophenonetetracarboxylic dianhydride, 153.0 grams (2.0 moles) of allyl chloride and 286.0 grams (2.2 moles) of 2-ethylhexanol. The mixture is heated to about 60° C. and there is then added 222.0 grams (2.2 moles) of triethylamine over a period of about one hour. The reaction mixture is then held at a temperature of about 105° C. for about two hours, and then washed several times with water and aqueous sodium carbonate washes. The reaction mixture is then steam sparged and dehydrated under vacuum. There is obtained 450 grams (60% of theory) of diallyl di-2-ethylhexyl benzophenonetetracarboxylate having an index of refraction at 25° C. of 1.5303 and a saponification number of 334.

Example 2

Following the procedure of Example 1, 322.0 grams (1.0 mole) of 3,3',4,4'-benzophenonetetracarboxylic dianhydride, 153.0 grams (2.0 moles) of allyl chloride, 440 grams (2.2 moles) of tridecanol and 222.0 grams (2.2 moles) of triethylamine are utilized to prepare diallyl ditridecyl benzophenonetetracarboxylate in excellent yield.

Example 3

Following the procedure of Example 1, 322.0 grams (1.0 mole) of 3,3',4,4'-benzophenonetetracarboxylic dianhydride, 153.0 grams (2.0 moles) of allyl chloride, 101 grams (2.2 moles) of ethanol and 222.0 grams (2.2 moles) of triethylamine are utilized to prepare diallyl diethyl benzophenonetetracarboxylate in good yield.

Example 4

Following the procedure of Example 1, 322.0 grams (1.0 mole) of 3,3',4,4'-benzophenonetetracarboxylic dianhydride, 153.0 grams (2.0 moles) of allyl chloride, 70.5 grams (2.2 moles) of methanol and 222.0 grams (2.2 moles) of triethylamine are utilized to prepare diallyl dimethyl benzophenonetetracarboxylate in good yield.

Example 5

Following the procedure of Example 1, 322.0 grams (1.0 mole) of 3,3',4,4'-benzophenonetetracarboxylic dianhydride, 153.0 grams (2.0 moles) of allyl chloride, 224.5 grams (2.2 moles) of isohexanol and 222.0 grams (2.2 moles) of triethylamine are utilized to prepare diallyl diisohexyl benzophenonetetracarboxylate in excellent yield.

Example 6

A suitable reaction vessel is charged with 322.0 grams (1.0 mole) of 3,3',4,4'-benzophenonetetracarboxylic dianhydride, 163.0 grams (2.2 moles) of n-butanol and 153.0 grams (2.0 moles) of allyl chloride. The mixture is heated to about 60° C. and 222.0 grams (2.2 moles) of triethylamine is added. Upon completion of the addition of the amine, the resultant mixture is held at a temperature of about 110° C. for about four hours and then washed several times with water and aqueous sodium carbonate washes. The reaction mixture is then steam sparged and dehydrated. There is obtained 385 grams (70% of theory) diallyl di-n-butyl benzophenonetetracarboxylate having a saponification number of 401, a specific gravity at 25° C. of 1.1662 and an index of refraction at 25° C. of 1.5425.

Example 7

Following the procedure of Example 6, 322.0 grams (1.0 mole) of 3,3',4,4'-benzophenonetetracarboxylic dianhydride, 153.0 grams (2.0 moles) of allyl chloride, 348 grams (2.2 moles) of decanol and 222.0 grams (2.2 moles) of triethylamine are utilized to prepare diallyl didecyl benzophenonetetracarboxylate in good yield.

Example 8

Following the procedure of Example 1, 322.0 grams (1.0 mole) of 3,3',4,4'-benzophenonetetracarboxylic dianhydride, 153.0 grams (2.0 moles) of allyl chloride, 198 grams (2.2 moles) of cyclohexanol and 222.0 grams (2.2 moles) of triethylamine are utilized to prepare diallyl dicyclohexyl benzophenonetetracarboxylate in good yield.

Example 9

Following the procedure of Example 8, 322.0 grams (1.0 mole) of 3,3',4,4'-benzophenonetetracarboxylic dianhydride, 153.0 grams (2.0 moles) of allyl chloride, 282 grams (2.2 moles) of 3,5-dimethylcyclohexanol and 222.0 grams (2.2 moles) of triethylamine are utilized to prepare diallyl di-3,5-dimethylcyclohexyl benzophenonetetracarboxylate in excellent yield.

Examples 10–14

Following the procedure of Example 1, 2.2 moles of each of the alkanols tabulated below is substituted for the 2-ethylhexanol. The product obtained in each instance is as indicated.

10. Alcohol=propanol
    Product=diallyl di-propyl benzophenonetetracarboxylate
11. Alcohol=nonanol
    Product=diallyl dinonyl benzophenonetetracarboxylate
12. Alcohol=dodecanol
    Product=diallyl didodecyl benzophenonetetracarboxylate
13. Alcohol=octadecanol
    Product=diallyl dioctadecyl benzophenonetetracarboxylate
14. Alcohol=4-nonylcyclohexanol
    Product=diallyl di-4-nonylcyclohexanol benzophenonetetracarboxylate

Example 15

To a suitable reaction vessel there is charged 161.0 grams (0.5 mole) of 3,3',4,4'-benzophenonetetracarboxylic dianhydride, 64.0 grams (1.1 moles) of allyl alcohol and 112.0 grams (1.5 moles) of allyl chloride. There is then added 122.0 grams (1.2 moles) of triethylamine. The mixture is heated to about 60° C. and then held at a temperature of about 75° C. for about two hours. The resultant reaction mixture is washed with several water washes. The reaction mixture is then steam sparged and dehydrated under vacuum. There is obtained 140.0 grams of tetraallyl benzophenonetetracarboxylate having a specific gravity at 25° C. of 1.206 and an index of refraction at 25° C. of 1.5600.

As previously stated, the products of this invention are useful as plasticizers and crosslinking agents for halogen-containing vinyl polymers. The advantageous properties possessed by the esters of this invention will be more fully understood by reference to the following examples.

The following testing procedures are used in evaluating the physical properties of plasticizers.

*Compatibility.*—Visual inspection of the plasticized composition is employed, incompatibility of the plasticizer with the polymer being demonstrated by cloudiness and exudation of the plasticizer.

*Low-temperature flexibility.*—Low-temperature flexibility is one of the most important properties of elastomeric vinyl compositions. While many plasticizers will produce flexible compositions at room temperature, the flexibility of these compositions at low temperature may vary considerably; i.e., plasticized polyvinyl chloride compositions that are flexible at room temperature often become very brittle and useless at lower temperatures. Low-temperature flexibility tests employed herein are according to the Clash-Berg method. This method determines the torsional flexibility of a plastic at various temperatures. The temperature at which the vinyl composition exhibits an arbitrarily established minimum flexibility is defined as the low-temperature flexibility of the composition. This value may also be defined as the lower temperature limit of the plasticized composition's usefulness as an elastomer.

*Volatility.*—A decrease in plasticizer concentration, when caused by volatilization of the plasticizer, often results in decreased flexibility of a plasticized polymer composition. Hence, plasticizers which are readily volatilized from the plasticized composition as a result of aging or heating are inefficient because, upon volatilization, the plasticized compositions become stiff and hard. The test for plasticizer volatility employed herein is that described by the American Society for Testing Materials under the designation D-1203-55T.

*Water resistance.*—The amount of water absorption and the amount of water leaching that take place when the plasticized composition is immersed in distilled water for 24 hours is determined.

*Kerosene extraction.*—Resistance to kerosene is measured as follows: A 2" diameter, 40 mil disc is suspended in a 50° C. oven for a 3-hour conditioning period to eliminate water, then cooled and weighed. The conditioned sample is then immersed in 400 ml. of kerosene for a period of 24 hours at 23° C. The sample is then removed from kerosene, blotted dry and suspended in a forcedraft 80° C. oven for 4 hours. The sample is then cooled and weighed. The percent loss in weight is reported as the kerosene extraction value.

*Hardness.*—A standard instrument made by Shore Instrument Company is used for this determination and expresses the hardness in units from 1 to 100. The hardness of the composition is judged by its resistance to the penetration of a standard needle applied to the composition under a standard load for a standard length of time.

The following examples illustrate the advantageous and unexpected results which are achieved by the use of the esters of the present invention in vinyl halide-containing polymers, but it is not intended that the invention be limited by or to such examples.

Example 16

One hundred parts by weight of polyvinyl chloride and 60 parts by weight of diallyl di-2-ethylhexyl benzophenonetetracarboxylate obtained in Example 1 are mixed on a rolling mill to a homogeneous blend. During the milling, substantially no fuming or discoloration is observed. Testing of the molded sheet for low-temperature flexibility gives a value of 9.8° C. A test of the volatility characteristics of the composition gives a value of 0.6%. Tests of the water resistance of the plasticized material show a loss of soluble matter of 0.01% and a 2.00% water absorption value. A test of the kerosene extraction characteristics of the composition gives a value of 0.1%. A Shore hardness value of 94 is obtained on this composition.

Example 17

One hundred parts of polyvinyl chloride and 60 parts by weight of diallyl dibutyl benzophenonetetracarboxylate obtained in Example 6 are mixed on a rolling mill to a homogeneous blend. During the milling, substantially no fuming or discoloration is observed. Testing of the molded sheet for low-temperature flexibility gives a value of 12.0° C. A test of the volatility characteristics of the composition gives a value of 0.4%. Tests of the water resistance of the plasticized material show a loss of soluble matter of 0.01% and a 0.39% water absorption value. A test of the kerosene extraction characteristics of the composition gives a value of 0.1%. A Shore hardness value of 94 is obtained on this composition.

Other compounds within the scope of this invention are found to possess properties of a similar nature.

While this invention has been described with respect to certain embodiments, it is not so limited, and it should be understood that variations and modifications may be made which are obvious to those skilled in the art without departing from the spirit or scope of the invention.

The embodiments of the invention in which an exclusive property or privilege is claimed are defined as follows:

1. A compound of the formula

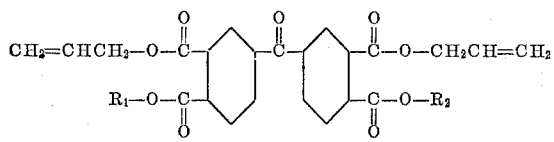

wherein $R_1$ and $R_2$ are like radicals selected from the group consisting of allyl, alkyl having from 1 to 18 carbon atoms and cycloalkyl having from 6 to 18 carbon atoms.

2. Tetraallyl benzophenonetetracarboxylate.
3. A compound of the formula

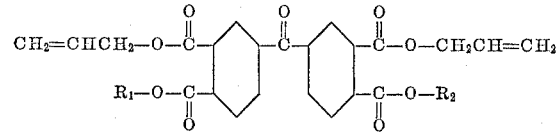

wherein $R_1$ and $R_2$ are like alkyl radicals having from 1 to 18 carbon atoms.

4. Diallyl di-n-butyl benzophenonetetracarboxylate.
5. Diallyl di-2-ethylhexyl benzophenonetetracarboxylate.
6. Diallyl didecyl benzophenanetetracarboxylate.
7. Diallyl ditridecyl benzophenonetetracarboxylate.
8. A compound of the formula

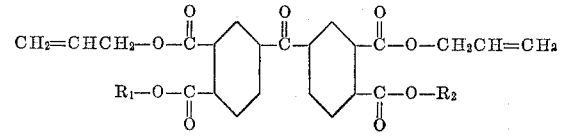

wherein $R_1$ and $R_2$ are like cycloalkyl radicals having from 6 to 18 carbon atoms.

9. Diallyl dicyclohexyl benzophenonetetracarboxylate.
10. Diallyl di-3,5-dimethylcyclohexyl benzophenonetetracarboxylate.

References Cited

UNITED STATES PATENTS 3,332,964   7/1967   McCracken et al. ____ 260—475

LORRAINE A. WEINBERGER, *Primary Examiner.*
T. L. GALLOWAY, *Assistant Examiner.*